(12) United States Patent
Choi et al.

(10) Patent No.: US 12,535,153 B2
(45) Date of Patent: Jan. 27, 2026

(54) APPARATUS FOR FOLDING TUBE

(71) Applicant: SAMSUNG ELECTRONICS CO., LTD., Suwon-si (KR)

(72) Inventors: Hyunwoong Choi, Suwon-si (KR); Hyunyoung Lee, Suwon-si (KR); Donghyun Kim, Suwon-si (KR); Pyungkang Kim, Suwon-si (KR); Beomsoo Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/658,493

(22) Filed: May 8, 2024

(65) Prior Publication Data
US 2024/0401720 A1    Dec. 5, 2024

(30) Foreign Application Priority Data
Jun. 1, 2023 (KR) .................. 10-2023-0071049

(51) Int. Cl.
*F16L 3/015* (2006.01)
*F16L 3/00* (2006.01)

(52) U.S. Cl.
CPC .............. *F16L 3/015* (2013.01); *F16L 3/00* (2013.01)

(58) Field of Classification Search
CPC ............ F16L 3/015; F16L 3/01; F16L 3/00
See application file for complete search history.

(56) References Cited

U.S. PATENT DOCUMENTS

| 475,056 | A | * | 5/1892 | Hall | F21V 21/24 248/312 |
| 586,881 | A | * | 7/1897 | Taubert | E04F 10/0614 212/230 |
| 636,034 | A | * | 10/1899 | Geudtner | F16M 11/04 362/432 |
| 828,709 | A | * | 8/1906 | Buckland | F16M 11/04 248/316.1 |
| 899,769 | A | * | 9/1908 | Tideman | F16M 11/12 379/454 |
| 997,650 | A | * | 7/1911 | Dahlen | F21V 21/24 379/454 |

(Continued)

FOREIGN PATENT DOCUMENTS

| JP | 2021-127214 A | 9/2021 |
| JP | 7213748 B2 | 1/2023 |

(Continued)

*Primary Examiner* — Nkeisha Smith
(74) *Attorney, Agent, or Firm* — Sughrue Mion, PLLC

(57) ABSTRACT

An apparatus for folding a tube includes a fixed mount fixedly installed in a facility, a first connection member installed on the fixed mount, a folding unit connected to the first connection member and expanding or compressing a tube folded and spirally wound, a second connection member disposed on a side opposite to a portion to which the first connection member is connected, and connected to the folding unit, and a chemical liquid container to which the second connection member is connected. The folding unit includes a plurality of link members for connection rotatably installed on the first connection member and the second connection member and a plurality of foldable link members sequentially connected and folded from the plurality of link members for connection.

20 Claims, 8 Drawing Sheets

(56) References Cited

U.S. PATENT DOCUMENTS

| | | | | |
|---|---|---|---|---|
| 1,025,442 A * | 5/1912 | Anderson et al. | F16M 11/04 | 248/277.1 |
| 1,060,950 A * | 5/1913 | Schwarz | F21V 21/24 | 248/278.1 |
| 1,109,038 A * | 9/1914 | Burns | F16M 11/04 | 211/105 |
| 1,215,261 A * | 2/1917 | Dyke | A47F 7/283 | 312/246 |
| 1,222,986 A * | 4/1917 | Pick | H04M 1/08 | 379/426 |
| 1,345,910 A * | 7/1920 | Cozart | A47F 5/08 | 211/105 |
| 1,354,477 A * | 10/1920 | Fleming | H04M 1/11 | 248/277.1 |
| 1,354,504 A * | 10/1920 | Dingwall | B65H 75/24 | 242/406 |
| 1,370,231 A * | 3/1921 | Smith | F21V 21/24 | 362/418 |
| 1,378,377 A * | 5/1921 | Heathcote | A21C 5/006 | 248/277.1 |
| 1,554,746 A * | 9/1925 | Meinel | B23K 5/24 | 239/281 |
| 1,624,695 A * | 4/1927 | Tufenkjian | A61J 9/0661 | 248/103 |
| 1,695,357 A * | 12/1928 | Worden | B60J 3/02 | 296/97.7 |
| 1,767,369 A * | 6/1930 | Johnson | B60Q 1/34 | 248/277.1 |
| 1,830,308 A * | 11/1931 | Zepke | A47F 5/08 | 248/289.11 |
| 1,851,178 A * | 3/1932 | Hebig | H01Q 1/08 | 336/20 |
| 1,858,104 A * | 5/1932 | Miles | A61B 18/14 | 607/86 |
| 3,168,791 A * | 2/1965 | Nutting | A47C 3/265 | 248/188.7 |
| 3,278,247 A * | 10/1966 | Tisdell | A47B 81/00 | 248/351 |
| 3,281,080 A * | 10/1966 | Hogg | A01G 25/09 | 239/734 |
| 3,399,909 A * | 9/1968 | Ambrose | F16L 3/015 | 248/68.1 |
| 3,721,260 A * | 3/1973 | Stahmer | H02G 11/006 | 137/355.16 |
| 3,759,475 A * | 9/1973 | Brown | H05K 7/1421 | 312/273 |
| 3,942,554 A * | 3/1976 | Werner | E04G 21/04 | 414/718 |
| 4,092,996 A * | 6/1978 | Kock | A01G 25/09 | 239/281 |
| 4,157,771 A * | 6/1979 | Smith | A61M 5/148 | 100/286 |
| 4,202,372 A * | 5/1980 | Gibbons | F16L 39/04 | 248/277.1 |
| 4,376,452 A * | 3/1983 | Tax | B67D 9/02 | 254/277 |
| 4,809,635 A * | 3/1989 | Essig | B63B 21/00 | 114/230.25 |
| 4,907,747 A * | 3/1990 | Kim | B65F 7/005 | 239/281 |
| 5,109,951 A * | 5/1992 | Lecorre | B66F 11/044 | 182/69.5 |
| 5,379,977 A * | 1/1995 | Ronn | B66F 7/0666 | 248/327 |
| 5,392,798 A * | 2/1995 | Hirose | B08B 9/093 | 134/167 R |
| 5,638,845 A * | 6/1997 | Oliver | B63B 57/02 | 134/167 R |
| 6,061,923 A * | 5/2000 | Case | A45D 20/12 | 34/90 |
| 6,192,905 B1 * | 2/2001 | Mincy | B08B 9/093 | 134/167 R |
| 7,708,169 B1 * | 5/2010 | Szoke, Jr. | B05C 17/0113 | 222/326 |
| 8,727,084 B1 | 5/2014 | Kuker | | |
| 9,308,698 B2 * | 4/2016 | Forrester | B29D 23/18 | |
| 9,316,350 B2 * | 4/2016 | Matsuoka | F16M 13/022 | |
| 9,439,446 B2 * | 9/2016 | McGill | B65D 35/40 | |
| 9,676,590 B1 | 6/2017 | Berry | | |
| 9,737,084 B2 * | 8/2017 | McGill | A23G 9/227 | |
| 9,757,761 B2 | 9/2017 | Angelini et al. | | |
| 10,655,345 B2 * | 5/2020 | Seow | E04G 3/34 | |
| 10,746,350 B2 * | 8/2020 | Pei | F16M 11/041 | |
| 11,091,348 B2 | 8/2021 | Gustafsson et al. | | |
| 11,118,704 B2 | 9/2021 | Gill | | |
| 11,602,477 B2 * | 3/2023 | Terayama | F16L 3/015 | |
| 11,633,766 B2 * | 4/2023 | Belue | B08B 9/0936 | 134/104.2 |
| 12,075,590 B2 * | 8/2024 | Aman | H05K 7/1489 | |
| 2005/0017117 A1 | 1/2005 | Moon et al. | | |
| 2020/0087102 A1 | 3/2020 | Russell et al. | | |
| 2024/0026996 A1 * | 1/2024 | Bauchart | H05K 7/20254 | |

FOREIGN PATENT DOCUMENTS

| | | |
|---|---|---|
| KR | 10-2005-0093192 A | 9/2005 |
| KR | 10-0787935 B1 | 12/2007 |
| KR | 10-2008-0049229 A | 6/2008 |
| KR | 10-2016-0077691 A | 7/2016 |

* cited by examiner

APPARATUS FOR FOLDING TUBE

CROSS-REFERENCE TO RELATED APPLICATION(S)

This application claims benefit of priority to Korean Patent Application No. 10-2023-0071049 filed on Jun. 1, 2023 in the Korean Intellectual Property Office, the disclosure of which is incorporated herein by reference in its entirety.

BACKGROUND

Embodiments are related to an apparatus for folding a tube. Folding the tube refers to rearranging a tube into a more compact shape such as a spiral or arcuate shape and does not require sharp bending. For example, folding the tube results in a smooth arcuate shape and does not require impressing by sharp bending an acute angle into the tube.

A PR (photo resist) chemical liquid used in a photo process, a semiconductor manufacturing process, is stored in a dedicated container, and the PR chemical liquid stored in the dedicated container may be supplied to a facility through a chemical liquid supply tube. Meanwhile, the chemical liquid supply tube is generally formed of a flexible material, and the chemical liquid supply tube connecting the dedicated container to the facility is used in a spirally wound state. In addition, when the dedicated container is replaced, the chemical liquid supply tube is stretched in the spirally wound state and is folded in the spirally wound state when the replacement of the dedicated container is completed.

However, whenever the chemical liquid supply tube is folded, an operator has to manually adjust a position of the chemical liquid supply tube and arrange it to avoid entanglement.

SUMMARY

An aspect embodiments is to provide an apparatus for folding a tube capable of preventing tube entanglement and reducing space occupied by the tube.

Provided herein is an apparatus for folding a tube. The apparatus includes a fixed mount fixedly installed in a facility, a first connection member installed on the fixed mount, a folding unit connected to the first connection member and expanding or compressing a tube folded and spirally wound, a second connection member disposed on a side opposite to a portion to which the first connection member is connected, and connected to the folding unit, and a chemical liquid container to which the second connection member is connected. The folding unit includes a plurality of link members for connection rotatably (rotably, able to rotate) installed on the first connection member and the second connection member and a plurality of foldable link members sequentially connected and folded from the plurality of link members for connection.

BRIEF DESCRIPTION OF DRAWINGS

The above and other aspects, features, and advantages of embodiments will be more clearly understood from the following detailed description, taken in conjunction with the accompanying drawings, in which.

DETAILED DESCRIPTION

Hereinafter, example embodiments will be described with reference to the accompanying drawings.

Figure 1:
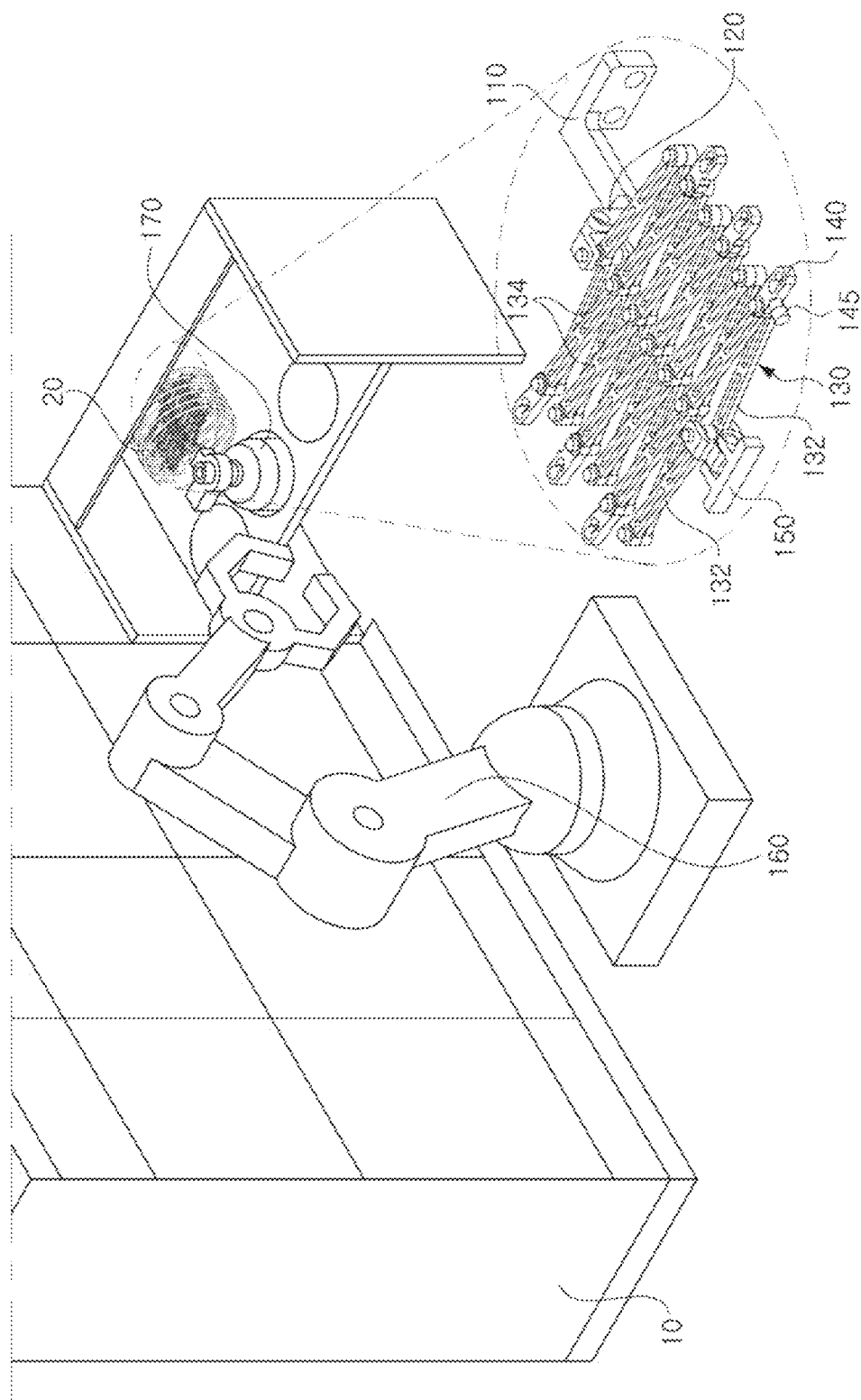
FIG. 1 is a configuration diagram illustrating an apparatus for folding a tube according to an exemplary embodiment.
Figure 2:
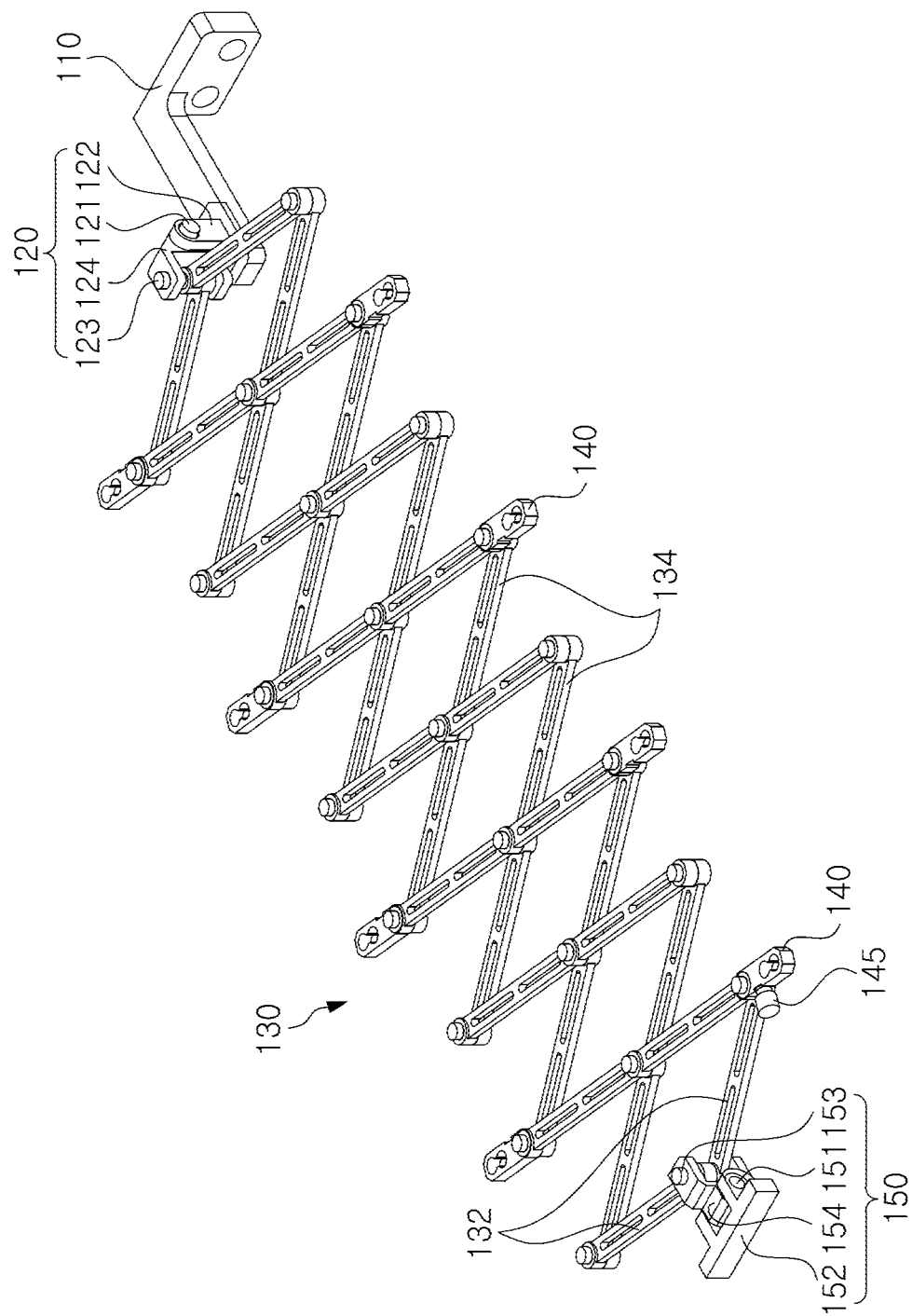
FIG. 2 is an enlarged view illustrating a folding unit of an apparatus for folding a tube according to an exemplary embodiment.

FIG. 1 is a configuration diagram illustrating an apparatus for folding a tube according to an exemplary embodiment, and FIG. 2 is an enlarged view illustrating a folding unit of an apparatus for folding a tube according to an exemplary embodiment.

Referring to FIGS. 1 and 2, the apparatus for folding a tube 100 according to an exemplary embodiment may include a fixed mount 110, a first connection member 120, a folding unit 130, a second connection member 150, a manipulator 160, and a chemical liquid container 170.

The fixed mount 110 may be fixedly installed in a facility 10. As an example, the facility 10 may be a semiconductor manufacturing facility used in a photo process. Meanwhile, the fixed mount 110 may be fixedly installed in the facility 10 by fastening bolts (not shown). As an example, the fixed mount 110 may be disposed to protrude from the front of the facility 10.

The first connection member 120 may be fixedly installed on the fixed mount 110. A numerical notation is used to help describe the components. For example, a 1-2 connector is conceptually a Y-connector with one input and two outputs. For example, items that are listed as "1-2" connect via a single portion on one side and two portions on the other side. Meanwhile, the first connection member 120 may include 1-1 connection member 122 installed on the fixed mount 110 and having a 1-1 rotating shaft 121 and a 1-2 connection member 124 rotatably (rotably) installed in the 1-1 rotating shaft 121 and connected to the folding unit 130 via a 1-2 rotating shaft 123. Meanwhile, since the 1-1 connection member 122 and the 1-2 connection member 124 of the first connection member 120 rotate via the 1-1 rotating shaft 121 and the 1-2 rotating shaft 123, the folding unit 130 connected to the first connection member 120 may rotate in a biaxial direction.

The folding unit 130 is connected to the first connection member 120 and expands or compresses the tube 20 folded and wound in a spiral shape. The folding unit 130 may be made of a suitable plastic or a suitable metal. The dimensions of the folding unit, type of plastic and/or metal involved are determined based on factors including the weight of the chemical liquid container 170. The weight of the chemical liquid container 170 depends on the chemical and the design of the facility 10. Mechanical strength requirements for the folding unit are determined by a designer working in this area, and the materials and strengths of the components of the folding unit 130 are specified in part based on the mechanical strength requirements. Meanwhile, the folding unit 130 may include a plurality of link members for connection 132 rotatably installed in the first connection member 120 and the second connection member 150 and a plurality of foldable link members 134 sequentially connected and folded from the plurality of link members for connection 132. Two link members for connection 132 are rotatably connected to the first connection member 120 and the other two link members for connection 132 are rotatably connected to the second connection member 150. Meanwhile, as an example, the link member for connection 132 may have a length half of the length of the foldable link member 134. Also, the foldable link member 134 may be sequentially connected from the link member for connection 132 connected to the first connection member 120 to be connected to the link member for connection 132 connected to the second connection member 150. Meanwhile, as an example, the foldable link members 134 disposed to cross each other have a bar shape and are rotatably connected to each other at the center. In addition, the foldable link member 134 connected at the end, among the foldable link members 134, may be rotatably connected to each other at the end. As such, the connected link member for connection 132 and the foldable link member 134 may be connected to each other so that an inner side thereof has a quadrangular shape.

Figure 3:
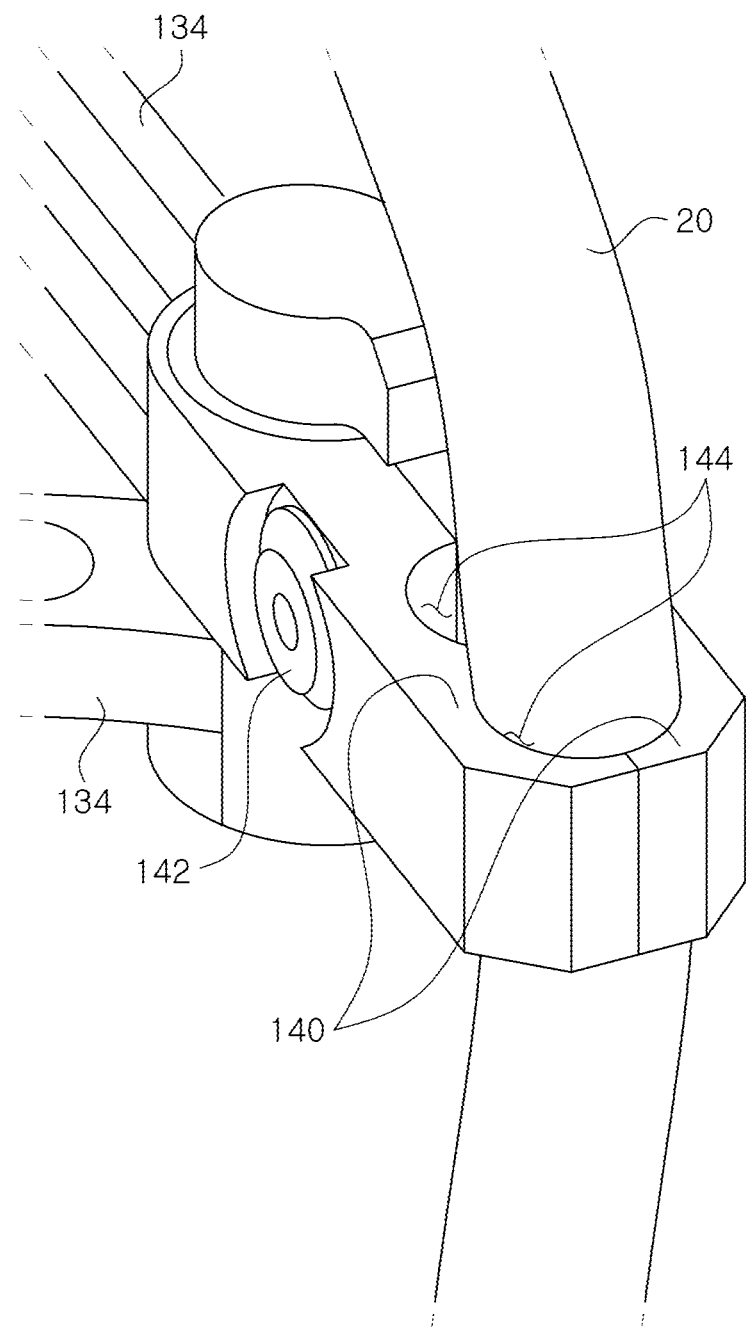
FIGS. 3 and 4 are diagrams illustrating a gripper of an apparatus for folding a tube according to an exemplary embodiment.
Figure 4:
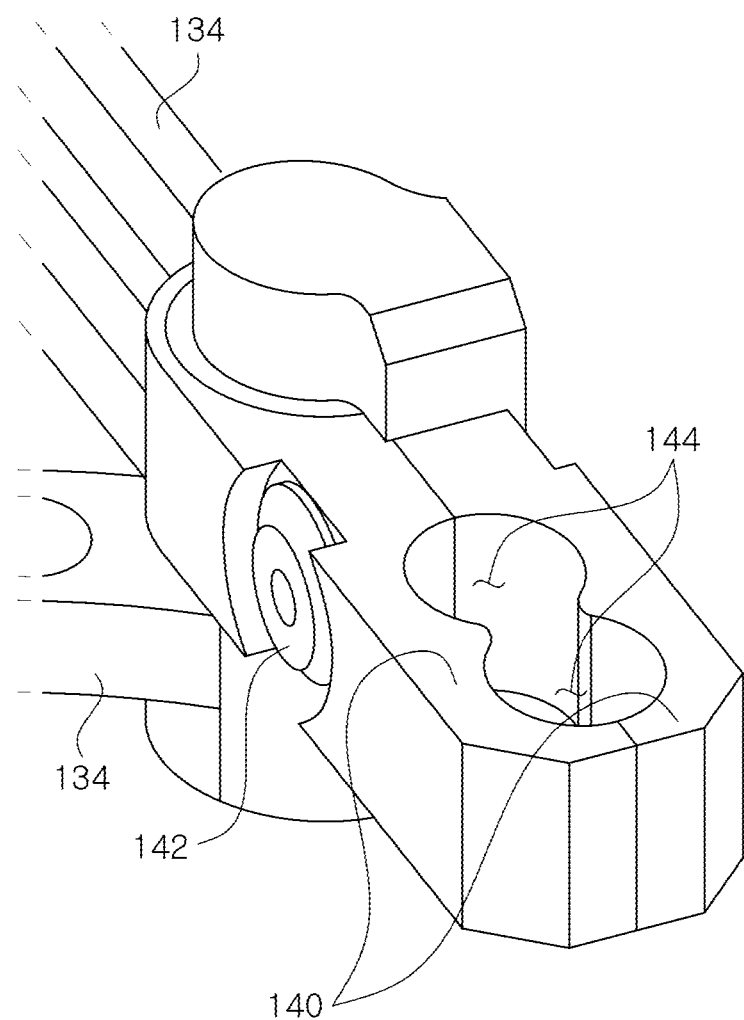

Meanwhile, as shown in detail in FIGS. 3 and 4, a pair of grippers 140 for fixing the tube 20 may be installed on at least one end portion of the foldable link member 134. The pair of grippers 140 may be coupled by, for example, bolts 142. However, embodiments are not limited thereto and the pair of grippers 140 may be coupled by a spring and a rubber band. In addition, the pair of grippers 140 may form at least one through-hole 144 through which the tube 20 passes. Meanwhile, a rubber seal (not shown) may be installed inside the through-hole 144. Accordingly, the tube 20 may be suppressed from being separated from the through-hole 144. As an example, the pair of grippers 140 may be installed in plurality on the foldable link member 134, and may be alternately disposed at one end portion and the other end portion of the foldable link member 134.

Meanwhile, the tube 20 installed in the gripper 140 may have one end connected to the chemical liquid container 170 and the other end connected to the facility 10.

Meanwhile, the link member for connection 132 is connected to the end of the foldable link member 134, and the foldable link member 134 is arranged to cross each other at the center and both ends to form a rhombic structure at the inside thereof as shown in FIG. 2. For example, a first foldable link member 134 and a second foldable link member 134 cross each other and are fixed in the center. Taken together, portions of first, second, third and fourth foldable link members 134 form the rhombic structure; the rhombic structure has a quadrangular shape. In addition, a joint (not shown) may be installed in a position at which the link member for connection 132 and the foldable link member 134 cross each other so that each of the link member for connection 132 and the foldable link member 134 may rotate. Accordingly, the folding unit 130 may be contracted and expanded.

Figure 5:
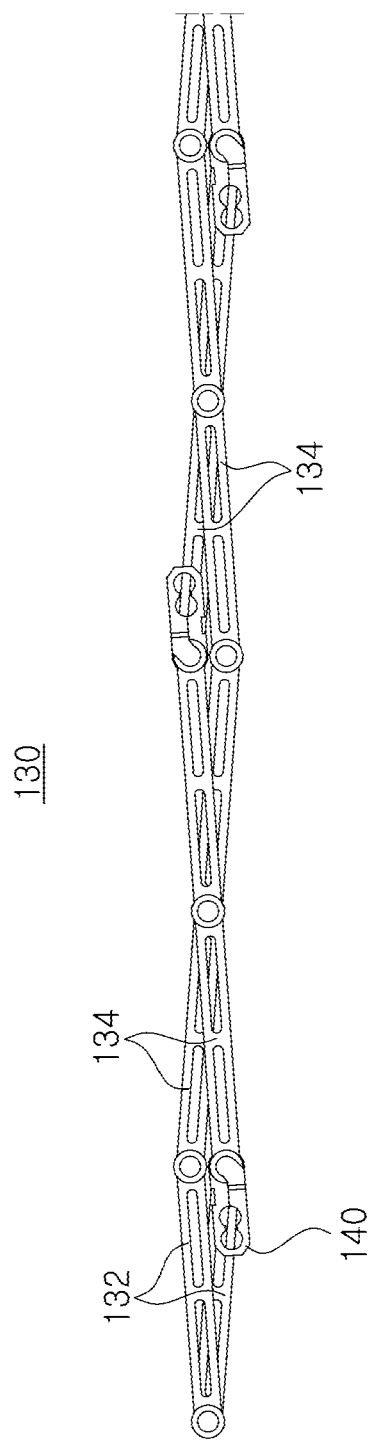
FIG. 5 is a diagram illustrating a posture of a singularity.
Figure 6:
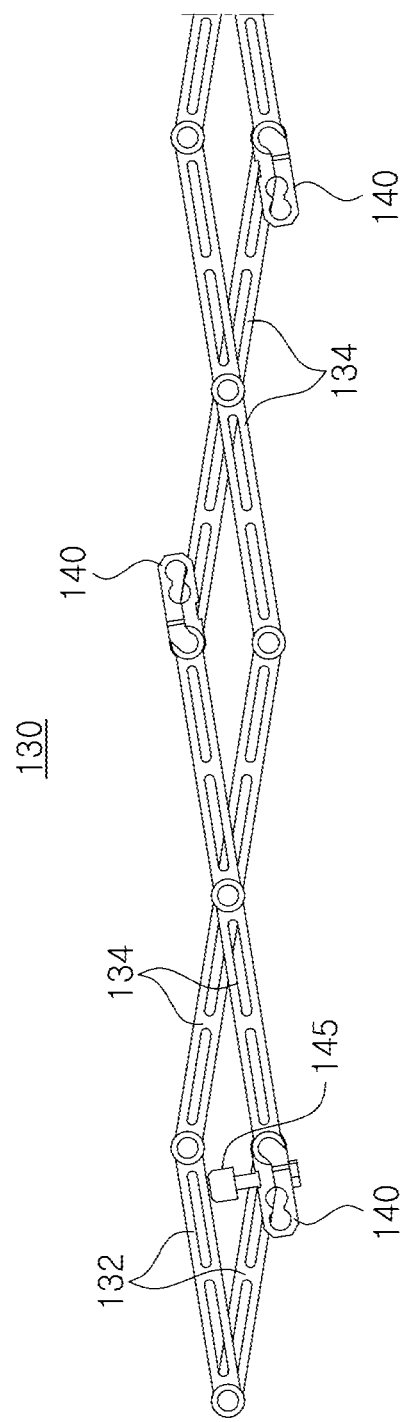
FIG. 6 is a diagram illustrating a stopper bolt of an apparatus for folding a tube according to an exemplary embodiment.

In addition, a stopper bolt 145 may be installed in a portion of the link member for connection 132 and the foldable link member 134. The stopper bolt 145 prevents the occurrence of a singular position. FIG. 5 shows a singular position. The singular position refers to a form in which the folding unit 130 maximally expands to be disposed in a straight line as an angle between the foldable link members 134 approaches 0 degrees. In the singular position, when the folding unit 130 is folded again, force is not easily transferred in the folding direction, causing a problem in that folding is not smoothly performed. This phenomenon is defined as singularity, and in order to prevent this, the stopper bolt 145 is installed to maintain the angle between the foldable link members 134 to some extent even at the maximum expansion position. In FIG. 5, a case in which one stopper bolt 145 is installed at each end of the folding unit 130 is shown as an example, but embodiments are not limited thereto and the number of stopper bolts 145 may be changed.

As an example, the stopper bolt 145 may be disposed inside the quadrangular shape formed by the link member for connection 132 and the foldable link member 134.

The second connection member 150 may include a 2-1 connection member 152 having a 2-1 rotating shaft 151 and connected to the chemical liquid container 170 and a 2-2 connection member 154 rotatably installed in the 2-1 rotating shaft 151 and connected to the folding unit 130 via a 2-2 rotating shaft 153. Meanwhile, since the 2-1 connection member 152 and the 2-2 connection member 154 are connected to the folding unit 130 via the 2-1 rotating shaft 151 and the 2-2 rotating shaft 153, the folding unit 130 may rotate in the biaxial direction The manipulator 160 folds the folding unit 130 by gripping the chemical liquid container 170. As an example, the manipulator 160 may be a 6-axis manipulator. Meanwhile, in the present embodiment, a case in which the chemical liquid container 170 is moved through the manipulator 160 is described as an example, but embodiments are not limited thereto and the folding unit 130 may be folded by an operator. For example, when the operator takes and moves the chemical liquid container 170, the folding unit 130 connected to the chemical liquid container 170 may be folded.

A chemical liquid supplied to the facility 10 is accommodated in the chemical liquid container 170. As an example, the chemical liquid container 170 may be connected to the folding unit 130 via the second connection member 150. Meanwhile, the chemical liquid container 170 may have a cap member 172 at an upper end portion, and the second connection member 150 may be connected to the cap member 172. In addition, the cap member 172 may be provided with a tube connector 172a to which the tube 20 is connected. As an example, the chemical liquid container 170 may be moved by the manipulator 160 or the operator as described above.

Figure 7:
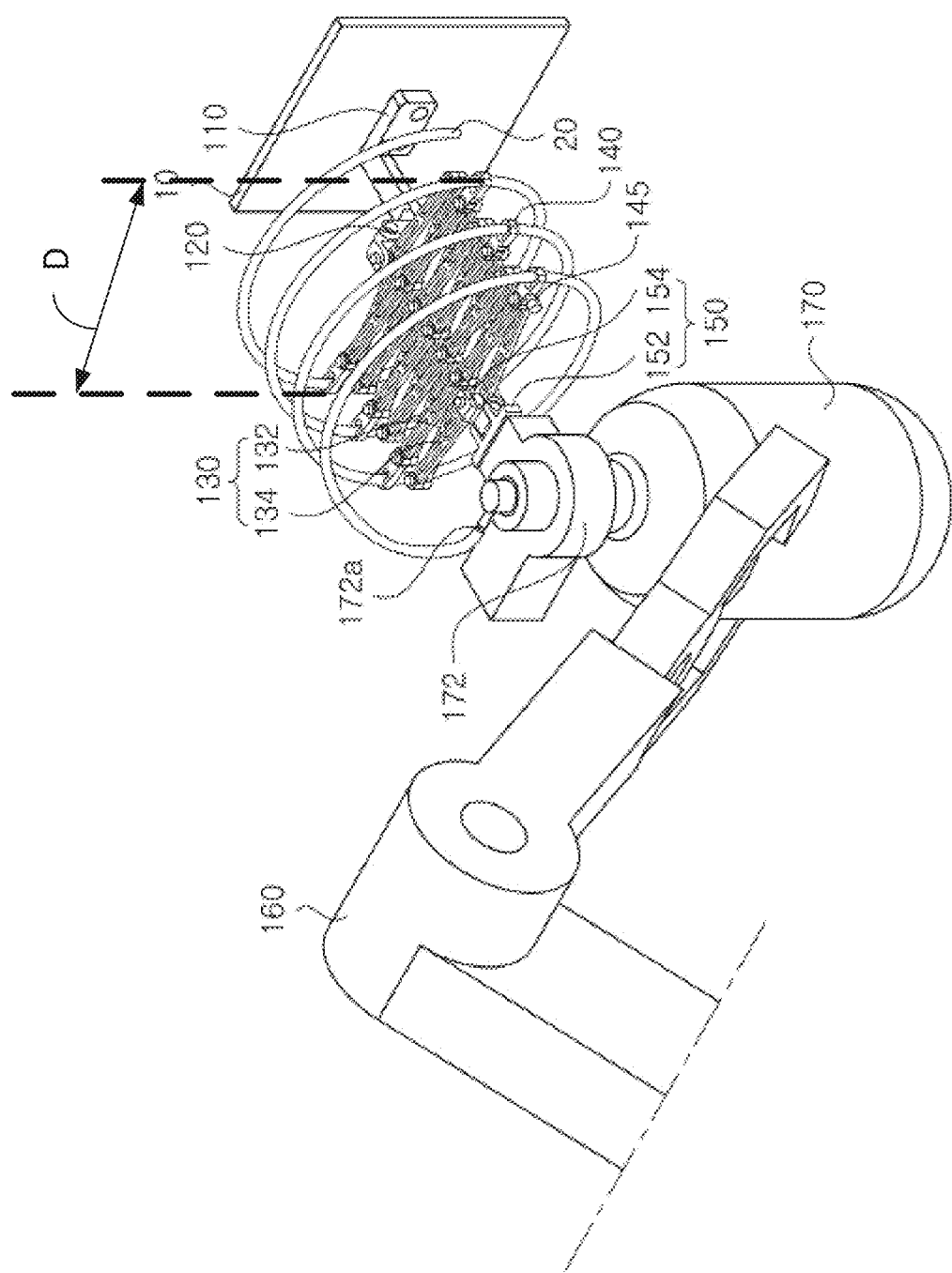
FIGS. 7 and 8 are diagrams illustrating an operation of an apparatus for folding a tube according to an exemplary embodiment.
Figure 8:
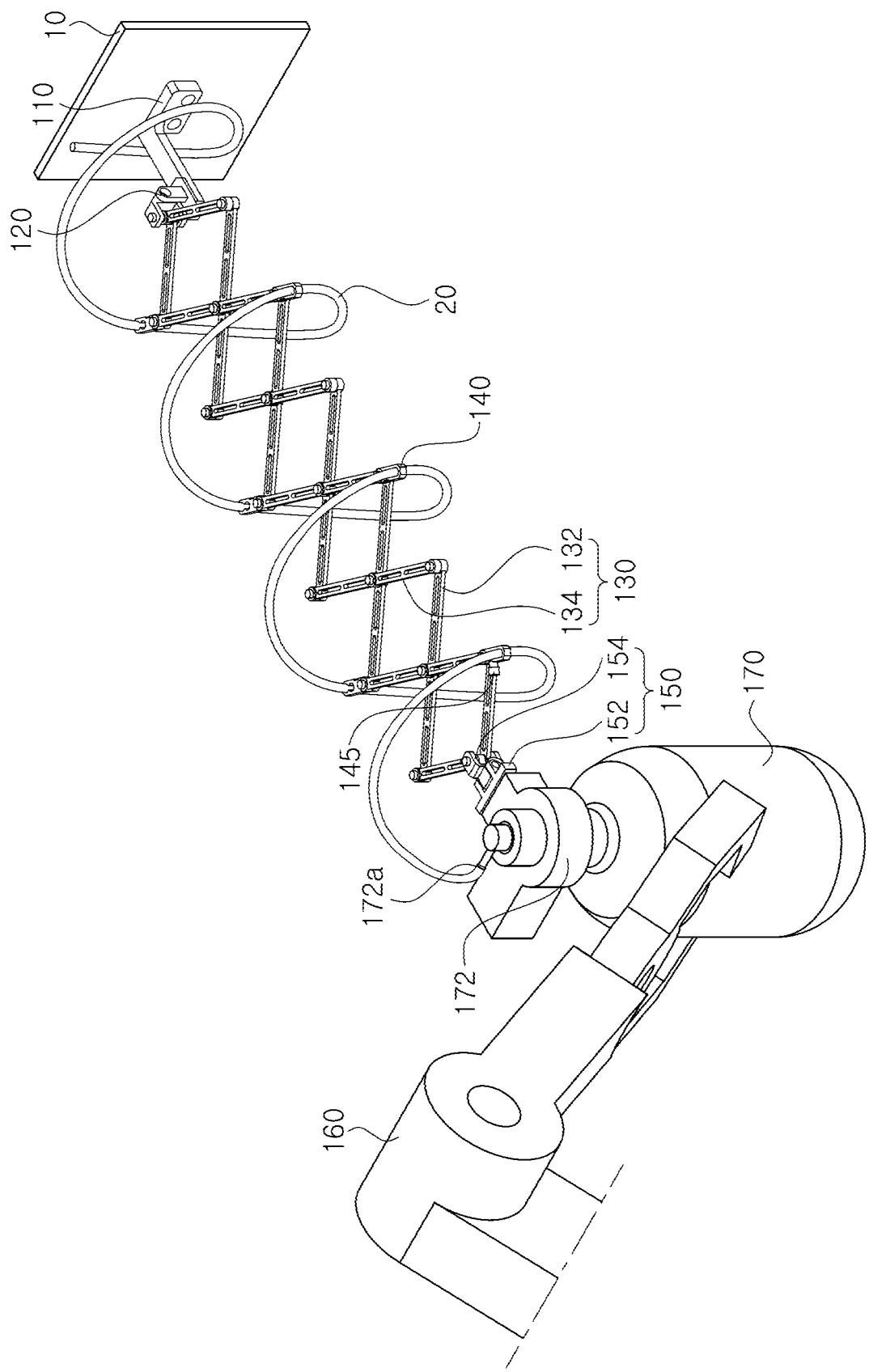

Here, referring to the operation of the apparatus for folding a tube 100 with reference to FIGS. 7 and 8, first, as shown in FIG. 7, when the tube 20 is in a folded state, that is, in a state in which the folding unit 130 is folded, the manipulator 160 grips the chemical liquid container 170. However, embodiments are not limited to the case in which the chemical liquid container 170 is gripped by the manipulator 160 and moved, and the chemical liquid container 170 may be moved by the operator. A dimension of the folding tube in the compressed state as indicated by D in FIG. 7. D indicates a dimension from one perimeter edge of the spirally wound tube to an opposite perimeter edge of the spirally wound tube.

Thereafter, as shown in FIG. 8, when the chemical liquid container 170 is moved by the manipulator 160 or the operator, the folding unit 130 is unfolded. At this time, the tube 20 gripped by the pair of grippers 140 may be unfolded while maintaining a spiral shape.

Thereafter, when the chemical liquid container 170 is moved toward the facility by the manipulator 160 or the operator, the folding unit 130 is folded again and the tube 20 is folded in a spiral shape as shown in FIG. 7. Accordingly, a storage area of the tube 20 may be reduced.

As described above, in the case of replacing the chemical liquid container 170, when the chemical liquid container 170 is replaced with the folding unit 130 unfolded and a chemical liquid is then supplied from the chemical liquid container 170 to the facility 10, the chemical liquid may be supplied with the folding unit 130 contracted. Furthermore, since the tube 20 may be contracted and expanded while being gripped by the gripper 145, a separate arrangement operation of the tube 20 by the operator may not be required. Accordingly, entanglement of the tube 20 may be prevented and space occupied by the tube 20 may be reduced.

The apparatus for folding a tube capable of preventing entanglement of the tube and reducing space occupied by the tube may be provided.

While example embodiments have been shown and described above, it will be apparent to those skilled in the art that modifications and variations could be made without departing from the scope of the appended claims.

What is claimed is:

1. An apparatus comprising:
   a tube;
   a fixed mount fixedly installed in a facility;
   a first connection member installed on the fixed mount;
   a folding unit connected to the first connection member and expanding or compressing the tube folded and spirally wound;
   a second connection member disposed on a side opposite to a portion to which the first connection member is connected, and connected to the folding unit; and
   a chemical liquid container to which the second connection member is connected,
   wherein the folding unit comprises a plurality of link members for connection rotatably installed on the first connection member and the second connection member and a plurality of foldable link members sequentially connected and folded from the plurality of link members for connection.

2. The apparatus of claim 1, wherein the plurality of foldable link members comprise a first foldable link member and a second foldable link member, and wherein the first foldable link member and the second foldable link member are disposed to cross each other and are rotatably connected to each other in a center.

3. The apparatus of claim 2, wherein the plurality of foldable link members comprise a third foldable link member and a fourth foldable link member, wherein the third foldable link member and the fourth foldable link member are connected to ends of the first foldable link member and the second foldable link member, and the third foldable link member and the fourth foldable link member are rotatably connected to each other.

4. The apparatus of claim 3, wherein the plurality of foldable link members are connected so that an inner side thereof forms a portion of a quadrangular shape.

5. The apparatus of claim 2, wherein a pair of grippers for fixing the tube is installed in at least one end portion of the first foldable link member.

6. The apparatus of claim 5, wherein the pair of grippers are coupled by any one of a bolt, a spring, or a rubber band.

7. The apparatus of claim 5, wherein the pair of grippers are configured to form at least one through-hole, and the tube is configured to pass through one through-hole of the at least one through-hole.

8. The apparatus of claim 5, wherein a plurality of the pair of grippers are alternately arranged on the plurality of foldable link members.

9. The apparatus of claim 2, wherein a stopper bolt is installed in a portion of a link member for connection and the first foldable link member.

10. The apparatus of claim 9, wherein the stopper bolt is installed on the first foldable link member connected to the link member for connection.

11. The apparatus of claim 10, wherein the stopper bolt is disposed inside a portion of a quadrangular shape formed by the link member for connection and the first foldable link member.

12. The apparatus of claim 1, wherein the first connection member includes a 1-1 connection member installed on the fixed mount and having a 1-1 rotating shaft and a 1-2 connection member rotatably installed on the 1-1 rotating shaft and connected to the folding unit via a 1-2 rotating shaft.

13. The apparatus of claim 1, wherein the second connection member comprises a 2-1 connection member having a 2-1 rotating shaft and connected to the chemical liquid container and a 2-2 connection member rotatably installed on the 2-1 rotating shaft and connected to the folding unit via a 2-2 rotating shaft.

14. The apparatus of claim 1, wherein the tube is configured with one end connected to the chemical liquid container and an other end connected to the facility.

15. The apparatus of claim 1, wherein the folding unit is folded as the chemical liquid container is moved by an operator.

16. The apparatus of claim 1, wherein a diameter of the spirally wound tube is approximately a width of the folding unit in a contracted state, wherein the diameter is a dimension from one perimeter edge of the spirally wound tube to an opposite perimeter edge of the spirally wound tube in the contracted state.

17. The apparatus of claim 1, wherein the apparatus is configured to provide supply from the chemical liquid container to the facility while the folding unit is contracted.

18. An apparatus comprising:
   a tube;
   a fixed mount fixedly installed in a facility;
   a first connection member installed on the fixed mount;
   a folding unit connected to the first connection member and expanding or compressing the tube folded and spirally wound;
   a second connection member disposed on a side opposite to a portion to which the first connection member is connected, and connected to the folding unit; and
   a chemical liquid container to which the second connection member is connected,
   wherein the first connection member comprises a 1-1 connection member installed on the fixed mount and having a 1-1 rotating shaft and a 1-2 connection member rotatably installed on the 1-1 rotating shaft and connected to the folding unit via a 1-2 rotating shaft, and
   the second connection member comprises a 2-1 connection member having a 2-1 rotating shaft and connected to the chemical liquid container and a 2-2 connection member rotatably installed on the 2-1 rotating shaft and connected to the folding unit via a 2-2 rotating shaft.

19. The apparatus of claim 18, wherein the folding unit comprises a plurality of link members for connection rotatably installed on the first connection member and the second connection member, and a plurality of foldable link members sequentially connected and folded from the plurality of link members for connection.

20. The apparatus of claim 19, wherein a pair of grippers for fixing the tube is configured in at least one end portion of a first foldable link member of the plurality of foldable link members.

\* \* \* \* \*